United States Patent
Yin et al.

[11] Patent Number: 5,996,894
[45] Date of Patent: Dec. 7, 1999

[54] VIRTUAL KEY PAD FOR OPTICAL SCANNING APPARATUS

[75] Inventors: Tang-Kai Yin; Jui-Ming Chen; Ke-Shun Tu, all of Hsinchu Hsien, Taiwan

[73] Assignee: Compeye Corporation, Hsinchu Hsien, Taiwan

[21] Appl. No.: 09/046,731

[22] Filed: Mar. 24, 1998

[51] Int. Cl.[6] .................................................. C06K 7/10
[52] U.S. Cl. .................................. 235/462.01; 235/454
[58] Field of Search ............................. 235/454, 472.01, 235/462.01, 462.15, 462.16, 462.25, 462.26, 462.43; 395/500, 800; 345/166

[56] References Cited

U.S. PATENT DOCUMENTS

| | | | |
|---|---|---|---|
| 5,392,447 | 2/1995 | Schlack et al. | 395/800 |
| 5,450,078 | 9/1995 | Silva et al. | 341/23 |
| 5,604,516 | 2/1997 | Herrod et al. | 345/168 |
| 5,747,785 | 5/1998 | Miller et al. | 235/472 |
| 5,832,422 | 11/1998 | Wiedenhoefer | 702/154 |
| 5,835,732 | 10/1998 | Kikinis et al. | 395/281 |
| 5,867,688 | 2/1999 | Simmon et al. | 395/500 |
| 5,892,502 | 4/1999 | Hiller | 345/168 |

*Primary Examiner*—Thien M. Le
*Attorney, Agent, or Firm*—Rosenberg, Klein & Lee

[57] ABSTRACT

Virtual key pads assigned to correspond to function commands conventionally executed in response to operating real key pads, are scanned by an optical scanning apparatus for recognizing if they have been touched by user or which among them have/has been touched, and for executing the function commands corresponded by that/those which was/were touched, whereby the virtual key pads act as real key pads, thereby real key pads are no longer necessary. Also a cover-mat with virtual key pads and more than one window thereon is suggested to conveniently adapt a scanning apparatus to various applications.

28 Claims, 3 Drawing Sheets

VIRTUAL KEY PAD FOR OPTICAL SCANNING APPARATUS

FIELD OF THE INVENTION

The invention relates to configuring virtual key pads for controlling an optical scanning apparatus, particularly the virtual key pads for performing, through the scanning operation of an optical scanning apparatus, those functions conventionally controlled by real key pads.

BACKGROUND OF THE INVENTION

Optical scanning apparatus has become popular apparatus to be used in scanners, photocopiers, and FAX machines, with functions continually promoted, resulting in growing number of control key pads just like most of electronic products. The negative effect of the trend on product evolution can be seen as follows.

Obviously the growing number of the key pads means cost increase and size expansion. On the other hand the existence of key pads make hardware relatively complicate, leading to more complicate fabrication process as a result of higher difficulty in allocating mechanism and processing circuit connection, and hence the increase of cost and failure rate in producing the product can not be avoided.

It is also obvious that real key pads and associated circuits may bring about higher failure rate for users of the product.

Therefore it is worth while to develop virtual key pads for performing functions of real key pads (to replace real key pads), especially for optical scanning apparatus.

SUMMARY OF THE INVENTION

The primary object of the invention is to suggest virtual key pads to be applied to scanning apparatus, so that real key pads and associated circuits are no longer necessary for the scanning apparatus. Obviously the invention realizes a scanning device with virtual key pads instead of real key pads, and consequently without need of real key pad mechanism and associated circuits.

Another object of the invention is to provide optical scanning apparatus with flexibility that its functions can be selected by users or determined by function key pads of selected combinations, such as a virtual identification code key pad for determining usage authority, evaluating usage status, or replacing function key pads of different combinations.

A further object of the invention is to suggest optical scanning apparatus with different types of windows resulting from virtually dividing its scanning plate, to achieve higher application flexibility.

Another further object of the invention is to suggest optical scanning apparatus allowing users to customize key pad functions, with virtual key pads to act as real key pads, to realize the feasibility of enabling users to arbitrarily change functions corresponding to (or assigned to) key pads or commands.

The invention is based on that the virtual key pads are placed on the scanning track of the optical scanning apparatus, and assigned to correspond to certain function commands/command (for enabling the execution of specific functions), whereby it can be recognized, through scanning the virtual key pads, if any of the virtual key pad (or which of the virtual key pads) have (or has) been touched, thereby the function commands (or command) to which the touched virtual key pads/pad correspond (or corresponds) can be executed.

An embodiment of the invention is that the virtual key pads are configured on the scanning plate of an optical scanning apparatus, and each is assigned to correspond to a function command (for enabling the execution of specific functions), whereby it can be recognized, through scanning each of the virtual key pads by the optical scanning apparatus (by a scanning head of the optical scanning apparatus, for example), if any of the virtual key pads (or which of the virtual key pads) have (or has) been touched, thereby the function commands (or command) to which the touched virtual key pads/pad correspond (or corresponds) can be executed. It must be noted the scanning head for scanning the virtual key pads is just a conventional device well known by those who skilled in the art.

Another embodiment of the invention is to cover the scanning plate of an optical scanning apparatus by a covermat with a plurality of virtual key pads thereon its top, each of the virtual key pads is assigned to correspond to a function command (for enabling the execution of specific functions), whereby it can be recognized, through scanning each of the virtual key pad by the optical scanning apparatus, if any of the virtual key pads (or which of the virtual key pads) have (or has) been touched, thereby the function commands (or command) to which the touched virtual key pads/pad correspond (or corresponds) can be executed.

The present invention may best be understood through the following description with reference to the accompanying drawings, in which:

DETAILED DESCRIPTION OF PREFERRED EMBODIMENTS

Figure 1:
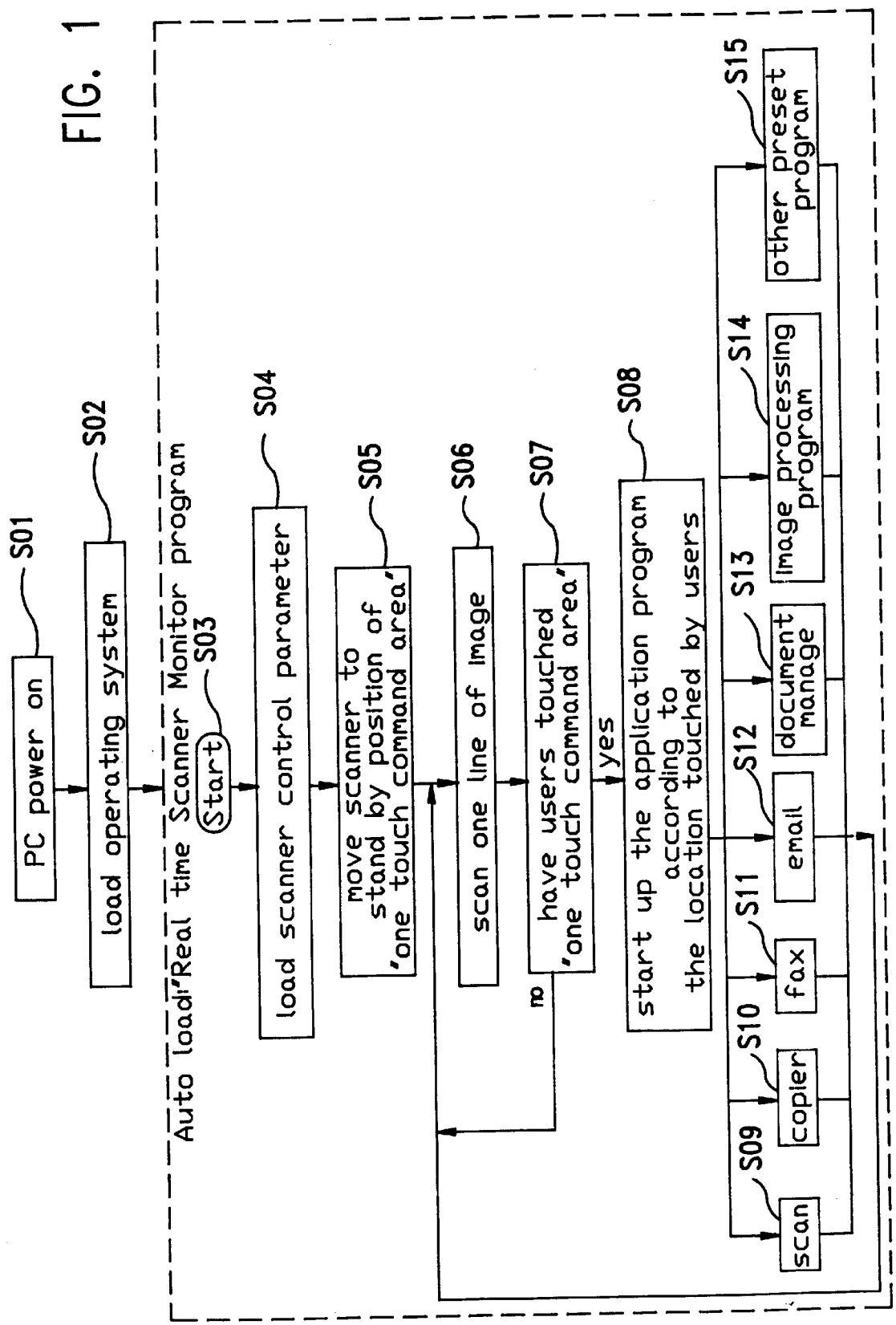
FIG. 1 is an operating flow chart for an embodiment based on the invention.

An operating flow chart for a preferred embodiment based on the invention and working with a computer system, as shown in FIG. 1, comprises steps S01~S15 of which S01 for turning on computer power and S02 for loading the operating system of the computer system.

After steps S01 and S02, an on-line scanning supervision program is loaded, and a main process for implementing an embodiment of the invention is initiated with step S03 to start an operating program in which: step S04 for loading scanning control parameters, step S05 for moving scanner to stand by position of "one touch command area", step S06 for scanning one line of image of virtual key pads placed in "one touch command area", step S07 for recognizing, based on the image of the virtual key pad been scanned, if any of virtual key pads have/has been touched. In case none of virtual key pad has been touched, returns to step S06; otherwise moves to step S08 for initiating an application program according to the position on the virtual key pads (which key pad/pads among the virtual key pads, for example) where a user has touched. The application program comprises steps S09~S15 for performing the functions such as scanning, photocopying, FAX transmission, E-Mailing, document management, video processing, or any other preset function. After all the functions corresponding to the touched virtual key pad/pads has/have been performed, the operating program returns to step S06 to wait for next command.

Figure 2:
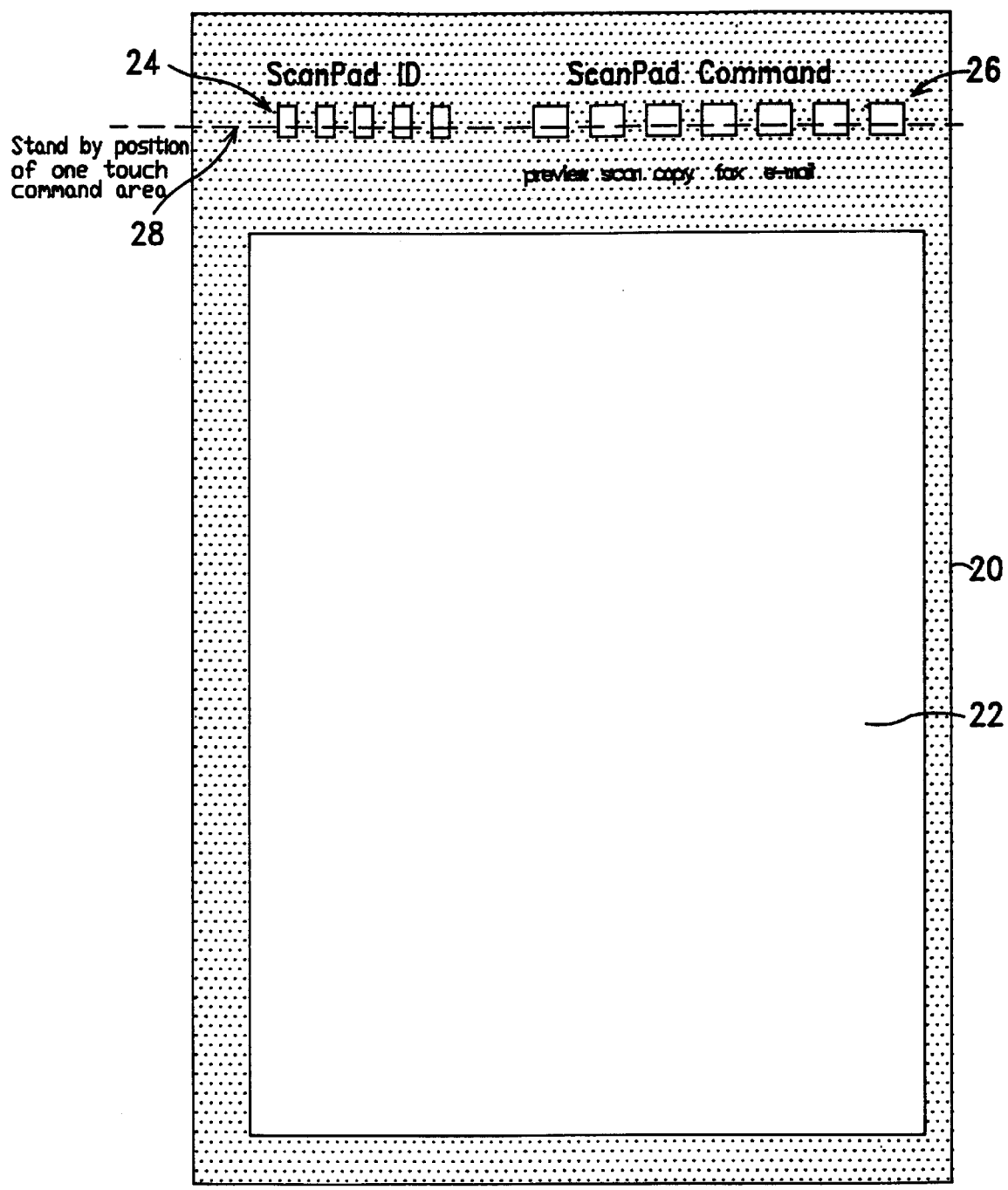
FIG. 2 shows an embodiment of virtual key pads based on the invention.

FIG. 2 shows a configuration of an embodiment of virtual key pads based on the invention and applied to optical scanning apparatus. Here the virtual key pad is placed on the optical scanning apparatus' scanning plate 20 on which there's a scanning window 22 for supporting (placing) objects to be scanned. Virtual identification code key pad (ScanPad ID) 24 and virtual function key pad (ScanPad Command) 26, both appear as blank image frames instead of real key pads, are configured on scanning plate 20 of the optical scanning apparatus, to function as real key pads. The region where virtual identification code key pad (ScanPad ID) 24 and virtual function key pad (ScanPad Command) 26 are located is called stand by position of one touch command area 28.

Step S06 in FIG. 1 is that the scanning head (a conventional device well known by industries, hence not shown in figures) of the optical scanning apparatus scans stand by position of one touch command area 28, to recognize if any of virtual identification code key pads (ScanPad ID 24 in FIG. 2) and virtual function key pads (ScanPad Command 26 in FIG. 2) has/have been touched by a user, whereby the command/commands pre-assigned to correspond to the touched key pad/pads can be executed. This is called one touch scanning.

Usually scanning plate 20 is a glass plate. A preferred embodiment is to form, using halftone printing technology, for virtual identification code key pad (ScanPad ID 24 in FIG. 2) and virtual function key pad (ScanPad Command 26 in FIG. 2) on scanning plate 20. Another embodiment is to stick on the scanning plate 20 a thin film on which virtual identification code key pad (ScanPad ID 24 in FIG. 2) and virtual function key pad (ScanPad Command 26 in FIG. 2) are printed. A piece of sticking paper or plastic film may be used as the thin film.

Obviously the virtual key pad 24 and 26 must be placed within (or on) the scanning track of the optical scanning apparatus. A preferred embodiment is to place the virtual key pad 24 and 26 beside scanning window 22.

With virtual identification code key pad (ScanPad ID 24 in FIG. 2), the performance of optical scanning apparatus can be promoted through managing usage authority, evaluating usage status, or replacing different command combinations of virtual function key pad (ScanPad Command 26 in FIG. 2), whereby a fixed hardware configuration can adapt to various different applications.

Figure 3:
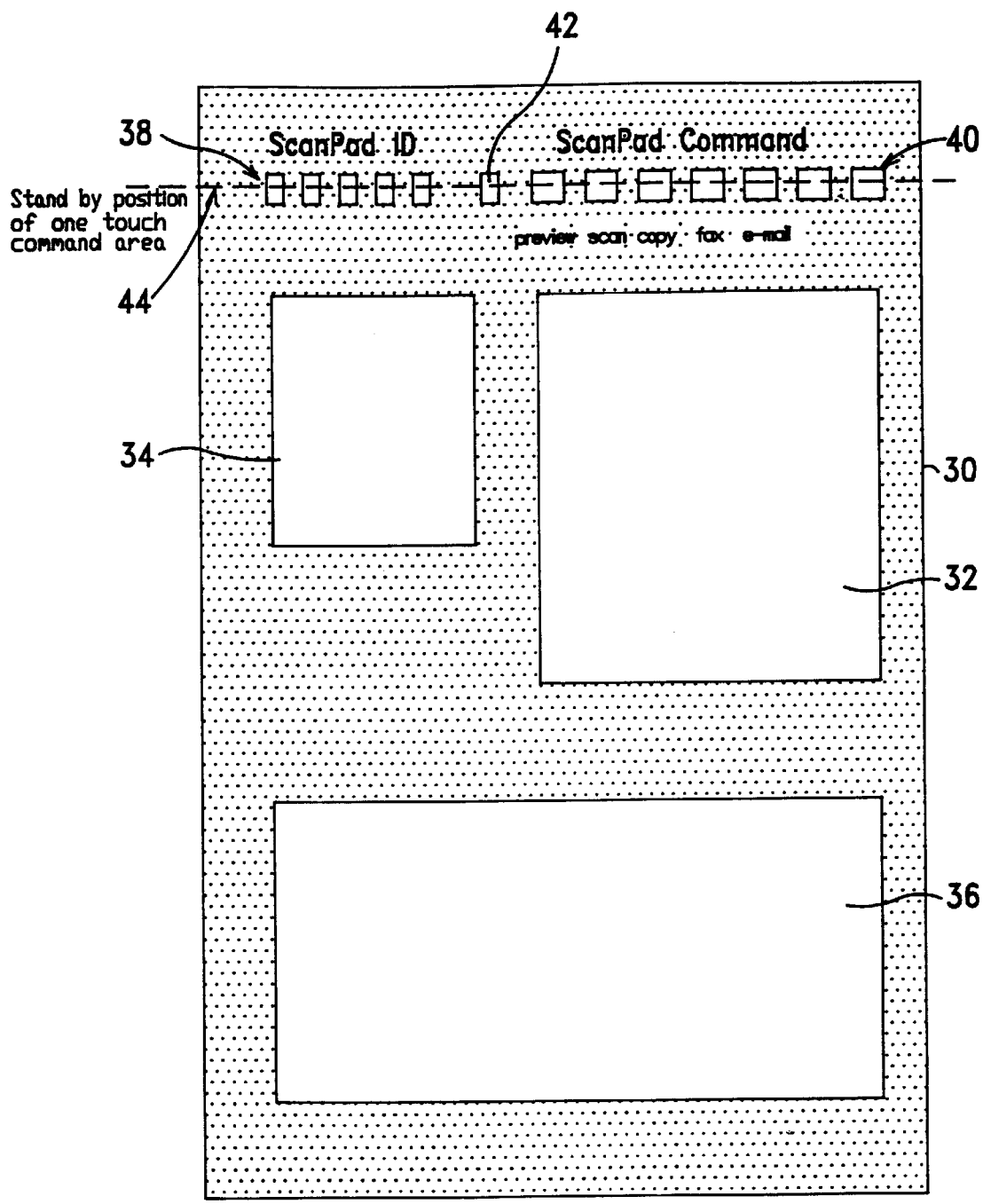
FIG. 3 shows another embodiment of virtual key pads based on the invention.

FIG. 3 shows another embodiment of the invention in which a cover-mat 30, preferably made of paper plate or soft plastic mat, is adopted to cover the scanning plate (not shown). On the top of cover-mat 30 are $1^{st}$, $2^{nd}$, and $3^{rd}$ scanning windows 32, 34, and 36, as well as virtual identification code key pad (ScanPad ID 38 in FIG. 3), virtual function key pad (ScanPad Command 40 in FIG. 3), and virtual enabling lock key pad 42, among which virtual key pads 38, 40, and 42 are located on stand by position of one touch command area 44.

Virtual key pads 32, 24, 36,38,40, and 42 can be formed by caving (making holes) cover-mat 30, or printing cover-mat 30 with a color background in which some blank frames are left to be used as virtual key pad 32, 24, 36,38,40, and 42.

The functions and operations of virtual key pad 38 and 40 are the same as 24 and 26 shown in FIG. 2. Virtual enabling lock key pad 42 is a virtual key pad for users to temporarily hold (disable) the operation of the optical scanning apparatus.

Scanning windows 32, 34, and 36 formed by dividing scanning plate 30, are for enclosing or supporting (or placing) different types of objects to be scanned, such as certain types of document, photograph, and drawings, or for enclosing objects to be scanned with different resolutions. Working with virtual key pad 38~42, these windows adapt the optical scanning apparatus to a variety of applications.

Another feature of using cover-mat 30 is that the same optical scanning apparatus may adapt to various applications by just working with different cover-mats. For example, different cover-mats with different combinations of virtual function key pads or different user assignment can perform different functions for different applications.

Also another feature of using cover-mat 30 is that the optical scanning apparatus, regardless of its usage age, product mode, or manufacturing source, can perform expected functions as long as a proper cover-mat 30 is covered on its scanning plate.

It can be understood now the virtual key pads suggested by the invention can be customized. That is, all the virtual key pads can be defined or assigned by user themselves to correspond to specific commands. Furthermore these virtal key pads can be used to amend the content of a command or an application program, free from circuit restriction, whereby functions of higher flexibility, expansion/adjustment convenience, and adaptability to user demand can be realized for an optical scanning apparatus.

Clearly no longer is there a need of hardware such as real key pads, push buttons or switches, for any scanning apparatus as long as the virtual key pads provided by the invention are used.

While the invention has been described in terms of what are presently considered to be the most practical and preferred embodiments, it is to be understood that the invention is not limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A virtual key pad to be scanned by an optical scanning apparatus for performing the functions of a real key pad, is characterized by that:

said virtual key pad is assigned to correspond to a function command which performs the function of said real key pad, and is formed on a scanning plate of said optical scanning apparatus to be scanned by said optical scanning apparatus for recognizing if said virtual key pad has been touched by a user, said function command is executed in case said virtual key pad has been touched, whereby the function of said real key pad is performed in response to that said virtual key pad has been touched, thereby said virtual key pad acts as said real key pad.

2. The virtual key pad according to claim 1 being formed on said scanning plate by halftone printing technology.

3. The virtual key pad according to claim 1 being formed on said scanning plate by sticking a thin film on said scanning plate.

4. The virtual key pad according to claim 1 being formed on said scanning plate by sticking on said scanning plate a thin film made of paper.

5. The virtual key pad according to claim 1 being formed on said scanning plate by sticking on said scanning plate a thin film made of plastic.

6. The virtual key pad according to claim 1 being formed beside a scanning window of said scanning plate.

7. A virtual key pad to be scanned by an optical scanning apparatus for performing the functions of a real key pad, is characterized by that:

said virtual key pad is assigned to correspond to a function command which performs the function of said real key pad, and is formed on a cover-mat lying on a scanning plate of said optical scanning apparatus, to be scanned by said optical scanning apparatus for recognizing if said virtual key pad has been touched by a user, said function command is executed in case said virtual key pad has been touched, whereby the function of said real key pad is performed in response to that said virtual key pad has been touched, thereby said virtual key pad acts as said real key pad.

8. The virtual key pad according to claim 7 being formed on said cover-mat which is made of paper.

9. The virtual key pad according to claim 7 being formed on said cover-mat which is made of plastic.

10. The virtual key pad according to claim 7 being formed beside a scanning window of said scanning plate.

11. The virtual key pad according to claim 7 being formed on said cover-mat which comprises more than one scanning window.

12. The virtual key pad according to claim 7 being formed by caving said cover-mat.

13. The virtual key pad according to claim 7 being formed by printing said cover-mat.

14. An optical scanning apparatus comprising:

a scanning plate for placing an object to be scanned;

a scanning head for scanning said object placed on said scanning plate; and at least one virtual key pad assigned to correspond to a function command, and formed on said scanning plate to be scanned by said scanning head for recognizing if said virtual key pad has been touched by users, and for executing said function command in case said virtual key pad has been touched.

15. The optical scanning apparatus according to claim 14 wherein said scanning plate is a glass plate.

16. The optical scanning apparatus according to claim 15 wherein said virtual key pad is formed on said glass plate by halftone printing technology.

17. The optical scanning apparatus according to claim 15 wherein said virtual key pad is formed by sticking a thin film on said glass plate.

18. The optical scanning apparatus according to claim 14 wherein said virtual key pad comprises virtual identification code key pads and virtual function key pads, said virtual identification code key pads for determining usage authority, and commands combinations for said virtual function key pads.

19. The optical scanning apparatus according to claim 14 wherein said scanning plate comprises a scanning window beside which said virtual key pad is formed.

20. An optical scanning apparatus comprising:

a scanning plate;

a cover-mat on said scanning plate, having at least one virtual key pad thereon to correspond to function commands; and a scanning head for scanning said virtual key pad for recognizing if said virtual key pad has been touched by users, and for executing said function commands in case said virtual key pad has been touched.

21. The optical scanning apparatus according to claim 20 wherein said cover-mat is made of material selected from among paper and plastic.

22. The optical scanning apparatus according to claim 20 wherein said virtual key pad is formed by caving said cover-mat.

23. The optical scanning apparatus according to claim 20 wherein said virtual key pad is formed by leaving blank frames among the background printed on said cover-mat.

24. The optical scanning apparatus according to claim 20 wherein said virtual key pad comprises virtual identification code key pads and virtual function key pads, said virtual identification code key pads for determining usage authority and commands combinations for said virtual function key pads.

25. The optical scanning apparatus according to claim 20 wherein said cover-mat comprises more than one scanning window for enclosing objects to be scanned.

26. The optical scanning apparatus according to claim 25 wherein said virtual key pad is formed beside said scanning window.

27. An optical scanning apparatus for scanning objects placed on a scanning track thereof, is characterized by that:

at least one virtual key pad assigned to correspond to a specific command, is placed on said scanning track to be scanned for recognizing if said virtual key pad has been touched by users, and for executing said specific command in case said virtual key pad has been touched.

28. The optical scanning apparatus according to claim 27 comprising a scanning window beside which said virtual key pad is placed.

* * * * *